No. 837,939. PATENTED DEC. 11, 1906.
C. B. LIVERMORE.
TICKET HOLDER.
APPLICATION FILED FEB. 9, 1906.
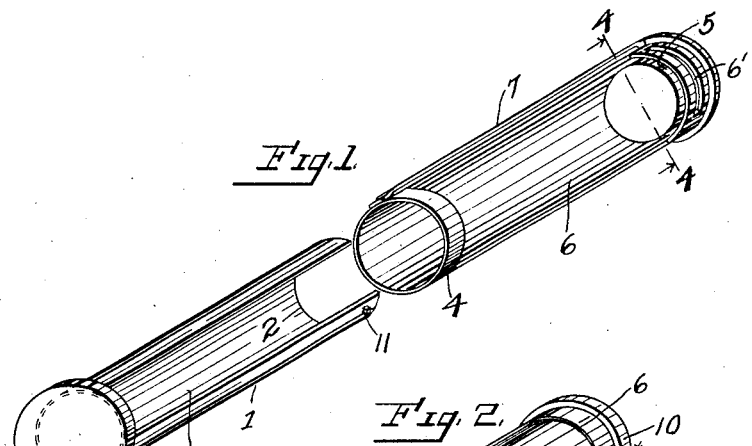
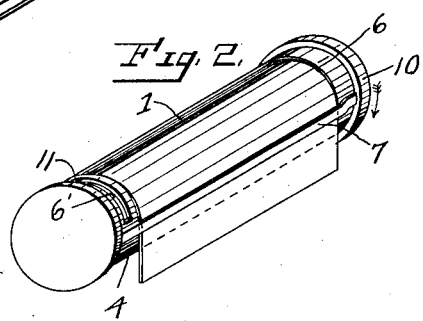
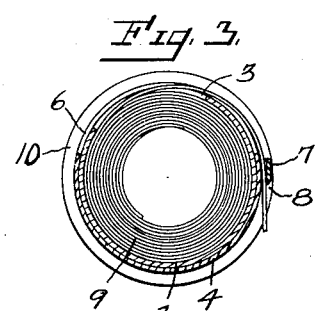
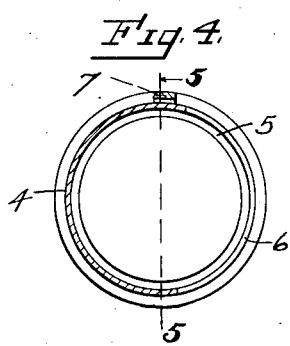
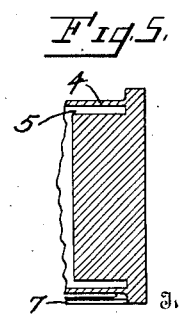
Witnesses
Dudley Moss.
Edward W. Cressman.
Inventor
CHARLES B. LIVERMORE
By
Adams & Brooks,
Attorneys.

UNITED STATES PATENT OFFICE.

CHARLES B. LIVERMORE, OF SEATTLE, WASHINGTON.

TICKET-HOLDER.

No. 837,939.

Specification of Letters Patent.

Patented Dec. 11, 1906.

Application filed February 9, 1906. Serial No. 300,305.

*To all whom it may concern:*

Be it known that I, CHARLES B. LIVERMORE, a citizen of the United States of America, and a resident of the city of Seattle, in the county of King and State of Washington, have invented certain new and useful Improvements in Ticket-Holders, of which the following is a specification.

The object of this invention is the provision of simple and inexpensively-constructed devices for holding the paper strip upon which a series of car-tickets, or the like, are printed and which is capable of being operated to conveniently present such tickets as required and whereupon they may be individually detached for use.

To these ends the invention consists in the novel construction, adaptation, and combination of features, as will be hereinafter described and claimed.

In the accompanying drawings, Figure 1 is a perspective view of an embodiment of my invention with the casing parts thereof separated. Fig. 2 is a like view of the same shown assembled and including a ticket-strip. Fig. 3 is a cross-sectional view of Fig. 2. Fig. 4 is a sectional view taken on 4 4 of Fig. 1, and Fig. 5 is a fragmentary section on line 5 5 of Fig. 4.

In the drawings the reference-numeral 1 designates an inner tubular part of the casing, provided with an open end 2 and a longitudinal slot 3 extending therefrom to the opposite closed end. 11 is a stud protruding from the outer face of said part in proximity to its open end and to one side of said slot.

4 represents an outer tubular part of the casing which, similarly to the before-described inner part, is provided with an open end and a closed end. At the closed end of each of said casing parts is a peripheral flange, whereby they may be conveniently held and oppositely rotated. The outer casing part is also provided with a longitudinal slot 6, extending to within a short distance of each of its ends, and has intermediate said slot and the closed end of the part a circumferentially-arranged slot 6', adapted to receive the stud 11 when the parts are together for the purpose of preventing the accidental separation of the casing parts and to limit the extent of rotation therebetween.

Secured by its ends to the outside of the casing part 4 and to one side of the slot 6 is a guard 7, formed of a flat blade provided with a sharp cutting edge 8 and having an interstice of at least the length of this slot between the guard and the casing part.

5 is an annular groove, which is advantageously employed in the end of the outer part 4 to receive the opposing end of the part 1.

The paper strip upon which the tickets are printed is wound into a roll, and thus inserted within the inner casing part, and is by its resiliency expanded to fill the tube and have its outer coil press against the inner surface of the latter, which is then inserted within the outer part, while the stud is pressed radially inward by a thumb-pressure exerted upon the contiguous side of the tube of part 1. The outer part is now rotated to register its slot 6 with the slot 2 of the other part, when the end of the paper strip may be drawn out to be threaded through the aforementioned interstice below the guard and the device is prepared for use.

To operate the invention, the flanges of the casing parts are grasped in the respective hands of the operator, and while the outer part is firmly held against turning the inner one is rotated in the direction indicated by the arrow in Fig. 2, carrying the rolled paper therewith to protrude its free end beyond the edge 8 of the guard to an amount equal to the depth of a ticket as regulated by the travel of the stud. The inner part of the casing is now retracted by imparting thereto a partial turn in the direction opposite to that designated by the arrow, while the outer part is firmly held and a thumb-pressure exerted downwardly in proximity to the rear end of the guard upon the paper strip to retain its end in threaded position beneath the guard, and thus be in condition for protruding, as before explained, to present another ticket for use.

In construction and operation the invention is extremely simple, yet perfectly adapted to the purposes for which intended.

Having described my invention, what I claim is—

1. A ticket-holder comprising a casing formed of outer and inner tubular parts each having a closed end, the outer of said parts being provided with a circumferential slot and also with a longitudinal slot, the inner of said parts being provided with a longitudinal slot, a stud upon the inner part engaging the outer part within said circumferential slot, and a guard at one side of the longitudinal slot of the outer part with an interstice therebetween.

2. A ticket-holder comprising a casing formed of outer and inner interfitting tubular parts each provided with a closed end and a longitudinal slot, a peripheral flange upon each part at its closed end, the outer of said parts being provided with a circumferential slot, the inner of said parts being provided with a stud engaging the outer part within said circumferential slot, said stud, and a guard fixedly connected to the outer part at one side of its longitudinal slot.

3. A ticket-holder comprising a casing having outer and inner interfitting tubular parts each having a closed end and a peripheral flange thereabout, the outer of said parts being provided with a circumferential slot and also with a longitudinal slot which terminates at short distances from the opposite ends of the part, the inner said part being provided with a longitudinal slot extending from a short distance of the closed end thereof to the opposite end, a stud upon the inner part engaging the outer part within said circumferential slot, and a guard upon the outer part with an interstice therebetween.

Signed at Seattle, Washington, this 31st day of January, 1906.

CHARLES B. LIVERMORE.

Witnesses:
JOHN W. FILKINS,
EDWARD L. GILLESPIE.